(12) United States Patent
Henningsson et al.

(10) Patent No.: US 10,652,523 B2
(45) Date of Patent: May 12, 2020

(54) MULTI-SENSOR VIDEO CAMERA, AND A METHOD AND PROCESSING PIPELINE FOR THE SAME

(71) Applicant: Axis AB, Lund (SE)

(72) Inventors: Toivo Henningsson, Lund (SE); Song Yuan, Lund (SE)

(73) Assignee: Axis AB, Lund (SE)

(*) Notice: Subject to any disclaimer, the term of this patent is extended or adjusted under 35 U.S.C. 154(b) by 199 days.

(21) Appl. No.: 16/005,128

(22) Filed: Jun. 11, 2018

(65) Prior Publication Data

US 2018/0367789 A1 Dec. 20, 2018

(30) Foreign Application Priority Data

Jun. 20, 2017 (EP) ..................................... 17176772

(51) Int. Cl.
*H04N 13/00* (2018.01)
*H04N 13/293* (2018.01)
(Continued)

(52) U.S. Cl.
CPC ............. *H04N 13/293* (2018.05); *G06T 1/20* (2013.01); *G06T 7/0002* (2013.01); *G06T 7/97* (2017.01);
(Continued)

(58) Field of Classification Search
CPC .......... H04N 13/00; H04N 5/00; G06F 15/00; G06T 7/00; G06T 1/00
See application file for complete search history.

(56) References Cited

U.S. PATENT DOCUMENTS 6,987,535 B1 1/2006 Matsugu et al.
2004/0017378 A1* 1/2004 Lin .................. G09G 5/397
345/592
(Continued)

FOREIGN PATENT DOCUMENTS

CN 104754228 A 7/2015

OTHER PUBLICATIONS

Wang, Yanying et al., "An Optimized Image Mosaid Algorithm with Parallel I/O and Dynamic Grouped Parallel Strategy Based on Minimal Spanning Tree," 2010 Ninth International Conference on Grid and Cloud Computing, IEEE Computer Society, 6 pages, 2010.
(Continued)

*Primary Examiner* — Maryam A Nasri
(74) *Attorney, Agent, or Firm* — Snyder, Clark, Lesch & Chung, LLP (57) ABSTRACT

There is provided a method performed in a multi-sensor video camera having a first and a second sensor with partly overlapping fields of view. A first and a second received video frame being simultaneously captured each has a non-overlapping portion and an overlapping portion. A frame of a first video stream is generated by joining together image data from the non-overlapping portions of the first and the second video frame with image data from the overlapping portion of the first video frame only, and a frame of a second video stream is generated to include image data from the overlapping portion of at least the second video frame. The frame of the first video stream and the frame of the second video stream are processed in parallel, wherein the processing of the frame of the second video stream includes preparing an overlay based on the image data from the overlapping portion of at least the second video frame. The overlay is added to the processed frame of the first video stream at a portion thereof corresponding to
(Continued)

the overlapping portion of the first video frame. Image data from the overlapping portion of the first video frame is blended with image data from the overlapping portion of the second video frame in at least one of the steps of preparing the overlay and adding the overlay.

20 Claims, 4 Drawing Sheets

(51) Int. Cl.
     *G06T 7/00*      (2017.01)
     *G06T 1/20*      (2006.01)
     *H04N 5/262*      (2006.01)
     *H04N 5/232*      (2006.01)
     *H04N 5/225*      (2006.01)

(52) U.S. Cl.
     CPC ....... *H04N 5/23238* (2013.01); *H04N 5/2622* (2013.01); *H04N 5/2258* (2013.01)

(56) References Cited

U.S. PATENT DOCUMENTS

| | | |
|---|---|---|
| 2006/0248030 A1* | 11/2006 | Raynor ................. G09G 5/397 706/20 |
| 2008/0024614 A1 | 1/2008 | Li et al. |
| 2011/0150329 A1 | 6/2011 | Lepine et al. |
| 2013/0147910 A1* | 6/2013 | Xin .................... H04N 5/23238 348/38 |
| 2015/0029306 A1 | 1/2015 | Cho et al. |

OTHER PUBLICATIONS

Brzeszcz, Mateusz et al., "Real-time construction and visualisation of drift-free video mosaics from unconstrained camera motion," The Journal of Engineering, 12 pages, Feb. 2, 2015.

Extended European Search Report issued in corresponding EP Application No. 17176772.6 dated Dec. 14, 2017, 7 pages.

* cited by examiner

MULTI-SENSOR VIDEO CAMERA, AND A METHOD AND PROCESSING PIPELINE FOR THE SAME

CROSS-REFERENCE TO RELATED APPLICATIONS

This application claims priority to European Patent Application No. 17176772.6, filed Jun. 20, 2017, which is incorporated herein by reference.

TECHNICAL FIELD

The present invention relates to the field of multi-sensor video cameras, and, in particular, to stitching of images captured by a multi-sensor video camera.

BACKGROUND

Video cameras having multiple sensors with partly overlapping fields of view are becoming increasingly popular in the surveillance market. Images being captured at the same time by the multiple sensors of such a video camera may be stitched together to form a panorama image which depicts the combined fields of view of the multiple sensors. The stitching is preferably made so as to provide a seamless transition between the images.

The process of stitching together the images from the multiple sensors is typically processing intense, thereby being prone to introduce latency in the processing pipeline of the video camera. In the end, this may put limitations on the frame rate of the video camera since the processing pipeline of the video camera may not be able to process the captured frames fast enough.

One solution to this problem, found in video cameras which are currently available on the market, is to include a field-programmable gate array (FPGA) upstream of the processing pipeline of the video camera to carry out the stitching of the simultaneously captured images before being input to the processing pipeline. However, this solution is expensive, in particular if the FPGA should be fast enough to not introduce undesirable delays caused by the stitching of the images. Further, this solution excludes that some of the image processing carried out in the processing pipeline of the video camera is performed on the individual images prior to the stitching being performed. This may in some cases lead to a poorer quality of the final stitched image being output at the end of the processing pipeline of the video camera. There is thus room for improvements.

SUMMARY OF THE INVENTION

In view of the above, it is thus an object of the present invention to provide an improved process for stitching together images being captured simultaneously by multiple sensors of a video camera. In particular, it is an object to reduce latency in the processing pipeline of the video camera caused by the process of stitching images. A further object is to provide a stitching process which is cost-efficient to implement.

According to a first aspect of the invention, the above object is achieved by a method performed in a multi-sensor video camera having a first and a second sensor with partly overlapping fields of view, comprising:

receiving a first video frame and a second video frame being simultaneously captured by the first sensor and the second sensor, respectively, wherein each of the first and the second video frame has a non-overlapping portion where it does not overlap with the other of the first and the second video frame, and an overlapping portion where it overlaps with the other of the first and the second video frame, generating a frame of a first video stream by joining together image data from the non-overlapping portions of the first and the second video frame with image data from the overlapping portion of the first video frame only, generating a frame of a second video stream, wherein the frame of the second video stream includes image data from the overlapping portion of at least the second video frame, processing the frame of the first video stream and the frame of the second video stream in parallel, wherein the processing of the frame of the second video stream includes preparing an overlay based on the image data from the overlapping portion of at least the second video frame; and adding the overlay to the processed frame of the first video stream at a portion thereof corresponding to the overlapping portion of the first video frame, wherein image data from the overlapping portion of the first video frame is blended with image data from the overlapping portion of the second video frame in at least one of the steps of preparing the overlay and adding the overlay.

A processing intense part of any stitching process is to calculate how to blend image data and then to blend the image data of the captured images in portions where the images overlap so as to provide a seamless transition between the images. The inventors have however realized that only a minor portion of the image data of the captured video frames is required in order to calculate how to blend image data, prepare the image data for blending, or even carrying out the blending. More specifically, depending on the particular embodiment, only image data from the overlapping portion of one or both of the video frames is required to carry out these steps. It is therefore proposed to separate out that minor portion of image data into a frame of a second video stream which may be processed in parallel with the majority of the image data being included in a frame of a first video stream. In this way, the processing intense part of the stitching process, which only operates on a minor part of the image data, may be carried out in parallel with other, less processing intense, parts of the stitching process which are carried out on the major part of the image data. Thereby latency is reduced.

Commercially available video cameras often have hardware adapted to add an overlay, e.g., in the form of a logotype or similar, on top of a video stream. The inventors have realized that this available functionality may be used in connection to stitching of images. For example, the frame of the second video stream (i.e., image data from one or both overlapping portions of the first and the second video frames) may be used to prepare an overlay which is then added on top of the frame of the first video stream, either by replacement of image data in the frame in the first video stream or by blending with image data in the frame in the first video stream. In this way, available functionality may be used, thereby making the implementation cost-efficient.

The first and the second sensor have partly overlapping fields of view. In other words, the first and the second sensor depict the same scene, but with different, yet overlapping, fields of view. This implies that there will be pixels in the first and the second video frame which hold image information from, i.e., depict, the same parts of the scene. Portions of the first and the second video frames comprising such pixels are referred to herein as overlapping portions. Conversely, portions of the first video frame where the pixels depict a part of the scene not being depicted by the second video frame, and vice versa, are referred to as non-overlapping portions.

By an overlay is generally meant an image which is intended to be overlaid on another image. By adding an overlay to a frame or an image is generally meant that the overlay is overlaid, or inserted, on the frame or the image. The overlay may be added by way of replacing image data in the frame or by blending the overlay with image data in the frame, e.g., by setting the transparency of the overlay.

By blending is generally meant calculating a weighted average.

In a first group of embodiments, the frame of the second video stream comprises image data from the overlapping portions of the second and the first video frame, wherein the step of preparing the overlay includes blending image data from the overlapping portion of the second video frame with image data from the overlapping portion of the first video frame. In such embodiments, image data from the overlapping portions of the first and the second video frame are thus blended during the preparation of the overlay. Since this process is carried out in parallel with the processing of the first video stream, no additional time delay is caused by the blending process.

In the first group of embodiments, the blending of image data corresponding to the overlapping portions of the first and the second video frame is carried out during the preparation of the overlay. Thus, no further blending is needed when adding the overlay to the processed frame of the first video stream. In such case, the overlay may be added by way of replacement. In more detail, the step of adding the overlay, the overlay replaces image data of the processed frame of the first video stream in the portion corresponding to the overlapping portion of the first video frame. A general advantage of the first group of embodiments is that the blending algorithm can be chosen more freely. Even an algorithm which is not supported by the available hardware which performs the adding of the overlay may be chosen. Examples of algorithms will be described in the following.

Blending of image data from the overlapping portions of the first and the second video frame during the preparation of the overlay may be carried out in various ways.

Generally, the blending may include calculating a weighted average of image data from the first video frame and image data from the second video frame for each pixel in the overlapping portions.

According to one example, referred to herein as "alpha-blending", the weights of the weighted average depends on a distance of the pixel to the boundaries between the overlapping portion and the non-overlapping portions of the first and the second video frames. In more detail, a weight associated with the image data from the overlapping portion of the second video frame depends on a shortest distance from the pixel to the boundary between the overlapping portion and the non-overlapping portion of the second video frame, and a weight associated with the image data from the overlapping portion of the first video frame depends on a shortest distance from the pixel to the boundary between the overlapping portion and the non-overlapping portion of the first video frame.

According to a further example, referred to herein as "multi-band-blending", the weights may be selected differently for spatially high-frequency contents and spatially low-frequency contents. For example, alpha-blending may be applied for lower frequencies, whereas the weights are set to either zero or one for higher frequencies depending on whether a pixel is closer to the boundary of the non-overlapping portion of the first video frame or to the boundary of the non-overlapping portion of the second video frame. In more detail, the blending may include:

calculating a first weighted average of image data from the overlapping portion of the first video frame and image data from the overlapping portion of the second video frame, wherein the first weighted average is calculated with respect to spatial frequencies being lower than a first threshold, calculating a second weighted average of image data from the overlapping portion of the first video frame and image data from the overlapping portion of the second video frame, wherein the second weighted average is calculated with respect to spatial frequencies being equal to or above a second threshold, the second threshold being larger than or equal to the first threshold, wherein weights are selected differently for the first weighted average and the second weighted average, and calculating the overlay by adding the first weighted average to the second weighted average.

According to yet an example, referred to herein as "feature-based-blending", the blending includes:

identifying objects in the overlapping portion of the first video frame and in the overlapping portion of the second video frame, calculating a weighted average of image data from the first video frame and image data from the second video frame in the overlapping portions, wherein, if an object is identified in both the overlapping portion of the first video frame and in the overlapping portion of the second video frame, a weight associated with one of image data of the first video frame or image data of the second video frame is set to zero for pixels identified as belonging to that object. With this type of blending, image data representing an object, such as a person for instance, is only included from one of the first video frame and the second video frame, thereby avoiding that the object turns up in duplicate at slightly different positions in the blended image. This may otherwise be the case due to the parallax effect of the multiple sensors.

According to a second group of embodiments, the blending takes place when adding the overlay to the processed frame of the first video stream, rather than when preparing the overlay. In such embodiments, the overlay includes image data from the overlapping portion of the second video frame only, and the step of adding the overlay includes blending the overlay with the processed frame of the first video stream at the portion thereof corresponding to the overlapping portion of the first video frame. The adding of the overlay is typically implemented by dedicated hardware, typically in the form of an application specific integrated circuit (ASIC). By performing the blending when adding the overlay, there is no need to run a custom algorithm in, e.g., a central processing unit or a graphics processing unit. Instead the dedicated hardware, e.g., ASIC, may be utilized to carry out the blending at the same time as the overlay is added, thereby accelerating the blending process.

The blending may, for example, be carried out by setting the transparency of the overlay when adding it to the processed frame of the first video stream. The transparency of the overlay may be given different values for different pixels. A transparency of one results in no blending in of image data from the overlay, and the resulting value in a pixel after adding the overlay is that of the first video frame. A transparency of zero results in total blending in of the overlay. In that case, the resulting value in a pixel after adding the overlay is that of the second video frame. A transparency between zero and one will result in blending in of the overlay to various degrees, i.e., the image data resulting value in a pixel after adding the overlay is a weighted average of the image data of the first video frame and the image data of the first video frame. Thus, for each pixel in the overlay, a degree of blending, for instance corresponding to a value between zero and one, may be specified during the preparation of the overlay. This degree of blending may then be used to set the transparency of the overlay when adding the overlay to the processed frame of the first video stream.

For example, the blending of the overlay with the processed frame of the first video stream may be made in accordance with a mask which for each pixel of the overlay defines a degree of blending. The mask may then be used to set the transparency of the overlay when adding the overlay to the processed frame of the first video stream.

The mask is typically determined when preparing the overlay. According to some embodiments, the mask is determined independently of any image data. For example, the degree of blending may correspond to the alpha-blending described above in that it only depends on the distance from a pixel to a boundary of a non-overlapping portion of the second video frame. In more detail, each pixel of the overlay may correspond to a pixel of the overlapping portion of the second video frame, wherein the degree of blending depends on the shortest distance from the pixel to a boundary between the overlapping portion and the non-overlapping portion of the second video frame.

According to some embodiments, the mask may additionally, or alternatively, be determined based on image data. The image data may correspond to the overlapping portion of the second video frame, but preferably it corresponds to the overlapping portions of both the first video frame and the second video frame. In the latter case, the frame of the second video stream includes image data from the overlapping portions of the second and the first video frame, and the step of preparing an overlay further comprises calculating the mask based on the image data from the overlapping portions of the second and the first video frame. In this way, the blending may be adapted to the image contents of the overlapping portions.

As further discussed above with respect to the first group of embodiments, blending means forming a weighted average of the image data in the overlapping portion of the first video frame and the image data in the overlapping portion of the second video frame. It is to be noted that the degree of blending, i.e., the values indicated by the mask, corresponds to the weight to be applied to the image data from the second video frame. The weight to be applied to the image data from the first video frame may be obtained as one minus the degree of blending.

The step of calculating the mask based on the image data from the overlapping portions of the second and the first video frame thus corresponds to calculating the weights associated with image data from the second and first video frames. What is said about calculating these weights above in connection to the first group of embodiments thus apply equally well to calculation of the degree of blending, i.e., the elements of the mask. For example, the mask may be calculated so as to include weights associated with multi-band blending and/or feature-based blending.

Depending on the particular case, the process of calculating the mask based on image data may be time demanding. In order to further reduce latency, it may therefore be advantageous to not calculate a new mask for each frame being processed. Once a mask has been calculated it may instead be reused for a number of frames. In more detail, the mask may be updated at a rate which is lower than a rate at which video frames are received from the first and the second sensor.

Prior to blending image data from the overlapping portions of the first video frame and the second video frame, the first video frame and the second video frame are preferably aligned. Therefore, the processing of the frame of the first video stream and the processing of the frame of the second video stream may include aligning image data of the first video frame and image data of the second video frame. The alignment may, inter alia, include performing barrel-correction, rotating the frames (typically if the sensors are mounted to take standing pictures of the scene), and performing projection of the first video frame and the second video frame, for instance onto a cylinder. The latter is made to compensate for the fact that the first and the second sensors are not mounted in the same position, meaning that the scene is depicted from different points of view. This may be corrected for by performing a projection, thereby giving a viewer an impression of the frames being captured from the same point of view. The particular alignment to apply is typically the same for each frame and may be determined during a calibration of the sensors.

According to a second aspect of the invention, the above object is achieved by a processing pipeline for a multi-sensor video camera having a first and a second sensor with partly overlapping fields of view, comprising:

a receiver configured to receive a first video frame and a second video frame being simultaneously captured by the first sensor and the second sensor, respectively, wherein each of the first and the second video frame has a non-overlapping portion where it does not overlap with the other of the first and the second video frame, and an overlapping portion where it overlaps with the other of the first and the second video frame, a frame generating component configured to generate a frame of a first video stream by joining together image data from the non-overlapping portions of the first and the second video frame with image data from the overlapping portion of the first video frame only, and to generate a frame of a second video stream, wherein the frame of the second video stream includes image data from the overlapping portion of at least the second video frame, a first processing component configured to process the frame of the first video stream, a second processing component configured to process the frame of the second video stream in parallel with the first processing component processing the frame of the first video stream, wherein the processing of the frame of the second video stream includes preparing an overlay based on the image data from the overlapping portion of at least the second video frame; and an overlay component configured to add the overlay to the processed frame of the first video stream at a portion thereof corresponding to the overlapping portion of the first video frame, wherein at least one of the second processing component and the overlay component is configured to blend image data from the overlapping portion of the first video frame with image data from the overlapping portion of the second video frame when preparing the overlay or adding the overlay.

According to a third aspect of the invention, the above object is achieved by a multi-sensor video camera, comprising:

a first sensor arranged to capture video frames depicting a first field of view;

a second sensor arranged to capture video frames simultaneously with the first sensor, the second sensor depicting a second field of view which partially overlaps with the first field of view; and a processing pipeline according to the second aspect being operatively connected to the first sensor and the second sensor so as to receive video frames captured by the first and the second sensor.

According to a fourth aspect of the invention, the above object is achieved by a computer program product comprising a computer-readable medium having computer-code instructions stored thereon for carrying out the method of the first aspect when executed by a device having processing capability.

The second, third and fourth aspects may generally have the same features and advantages as the first aspect. It is further noted that the invention relates to all possible combinations of features unless explicitly stated otherwise.

Generally, all terms used in the claims are to be interpreted according to their ordinary meaning in the technical field, unless explicitly defined otherwise herein. The steps of any method disclosed herein do not have to be performed in the exact order disclosed, unless explicitly stated.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, where the same reference numerals will be used for similar elements, wherein.

DETAILED DESCRIPTION OF EMBODIMENTS

The present invention will now be described more fully hereinafter with reference to the accompanying drawings, in which embodiments of the invention are shown. The systems and devices disclosed herein will be described during operation.

Figure 1:
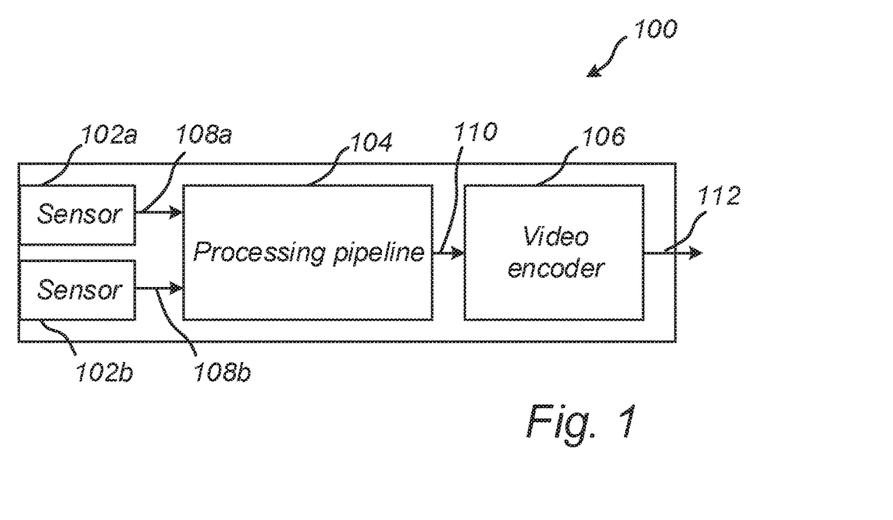
FIG. 1 schematically illustrates a multi-sensor video camera according to embodiments.

FIG. 1 illustrates a multi-sensor video camera 100. The video camera 100 comprises a plurality of image sensors 102a, 102b, and a processing pipeline 104. The video camera 100 may also comprise a video encoder 106. Here, for the sake of illustration and simplicity, two image sensors 102a, 102b are shown. However, it should be understood that the video camera 100 may comprise more than two image sensors.

The image sensors 102a, 102b are arranged in relation to each other such that they have partly overlapping fields of view of a scene. This implies that video frames captured by the image sensors 102a, 102b will be partly overlapping, meaning that a part of the scene will be depicted in video frames captured by more than one (but not necessarily all if there are more than two image sensors) of the image sensors 102a, 102b. There are thus pixels in video frames captured by at least two of the image sensors which depict the same part of the scene.

The video camera 100 is arranged to capture video frames at a certain frame rate. In particular, the video camera 100 captures video frames simultaneously using the plurality of sensors 102a, 102a at a certain rate. In particular, the video camera 100 is arranged to simultaneously capture a first video frame 108a using a first image sensor 102a and a second video frame 108b using a second image sensor 102b. The captured video frames 108a, 108b are then input to the processing pipeline 104 being arranged downstream of the image sensors 102a, 102b in the video camera 100.

The processing pipeline 104 is arranged to process the video frames 108a, 108b captured by the image sensors 102a, 102b. By a processing pipeline is generally meant a set of data processing elements connected in a sequence, where the output of one element is the input of the next one. In particular, the processing pipeline 104 is configured to stitch the video frames 108a, 108b together to create a panorama image 110 of the scene. The panorama image 110 may thus correspond to the combined, i.e., the union of the, fields of view of the image sensors 102a, 102. Once a panorama image 110 has been created, it may be forwarded the video encoder 106 which encodes the panorama image 110 prior to being output from the video camera 100, e.g., in the form of a bitstream 112 which is transmitted over a network to a video decoder.

Figure 2:
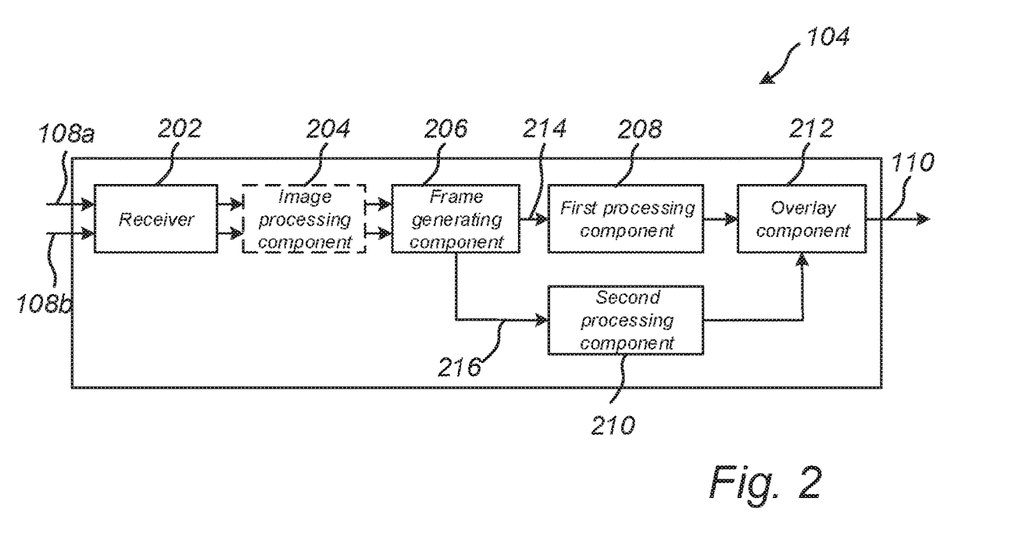
FIG. 2 schematically illustrates a processing pipeline of the multi-sensor video camera of FIG. 1.

FIG. 2 illustrates the processing pipeline 104 in more detail. The processing pipeline comprises a receiver 202, a frame generating component 206, a first processing component 208, a second processing component 210, and an overlay component 212. The processing pipeline may also comprise an image processing component 204.

The receiver is arranged to receive the video frames 108a, 108b captured by the image sensors 102a, 102b shown in FIG. 1. The frame generating component 206 is arranged downstream of the receiver 202 and is arranged to receive the video frames 108a, 108b from the receiver 202, optionally via an image processing component 204 arranged downstream of the receiver 202 but upstream of the frame generating component 206. The image processing component 204 may, e.g., perform various kinds of image processing, such as defect pixel correction, artefact removal like column fixed pattern noise compensation and crosstalk compensation, white balancing, vignetting correction, noise filtering, demosaicing, sharpening, colour matrixing, dark current correction, and gamma correction, which is commonly performed in an image processing pipeline of a video camera. However, some or all of the image processing, such as the white balance processing, may instead be carried out by the first 208 and/or the second 210 processing components. The frame generating component 206 will in turn generate frames of a first video stream 214 and a second video stream 216. Frames of the first video video stream 214 are forwarded to the first processing component 208, and frames of the second video stream 216 are forwarded to the second processing component 210 which is arranged in parallel with the first processing component 208. The output of the first 208 and the second 210 processing component is then forwarded to the overlay component 212, which in turn outputs a panorama image 110. This process will be described in more detail below.

The processing pipeline 104 thus comprises various components 202, 204, 206, 208, 210, 212 which are configured to implement the functionality of the processing pipeline 104. In particular, each illustrated component corresponds to a functionality of the processing pipeline 104. However, as a skilled person understands, the various components are also associated with structure which is included in the processing pipeline 104 to implement the functionality of the components. As a skilled person is aware, the specific structure may depend on the particular implementation of the components, e.g., whether they are implemented in hardware, software, or a combination thereof.

Generally, the processing pipeline 104 may comprise circuitry which is configured to implement the components 202, 204, 206, 208, 210, 212 and, more specifically, their functionality.

In a hardware implementation, each of the components 202, 204, 206, 208, 210, 212 may correspond to circuitry which is dedicated and specifically designed to provide the functionality of the component. The circuitry may be in the form of one or more integrated circuits, such as one or more application specific integrated circuits. By way of example, the frame generating component 206 may thus comprise circuitry which, when in use, generates the first video stream 214 and the second video stream 216.

In a software implementation, the circuitry may instead be in the form of one or more processors, such as one or more microprocessors, which in association with computer code instructions stored on a (non-transitory) computer-readable medium, such as a non-volatile memory, causes the processing pipeline 104 to carry out any method disclosed herein. In that case, the components 202, 204, 206, 208, 210, 212 may thus each correspond to a portion of computer code instructions stored on the computer-readable medium, that, when executed by the processor, causes the processing pipeline 104 to carry out the functionality of the component.

It is to be understood that it is also possible to have a combination of a hardware and a software implementation, meaning that the functionality of some of the components 202, 204, 206, 208, 210, 212 are implemented in hardware and others in software.

Figure 5:
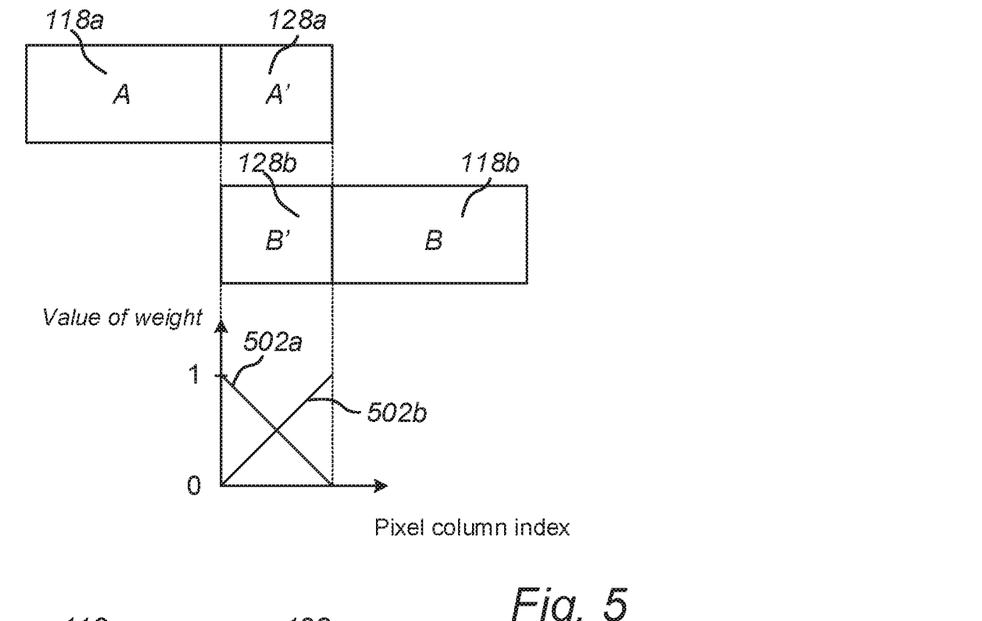
FIG. 5 schematically illustrates and example of how to select weights for blending image data of overlapping portions of a first and a second video frame.
Figure 6:
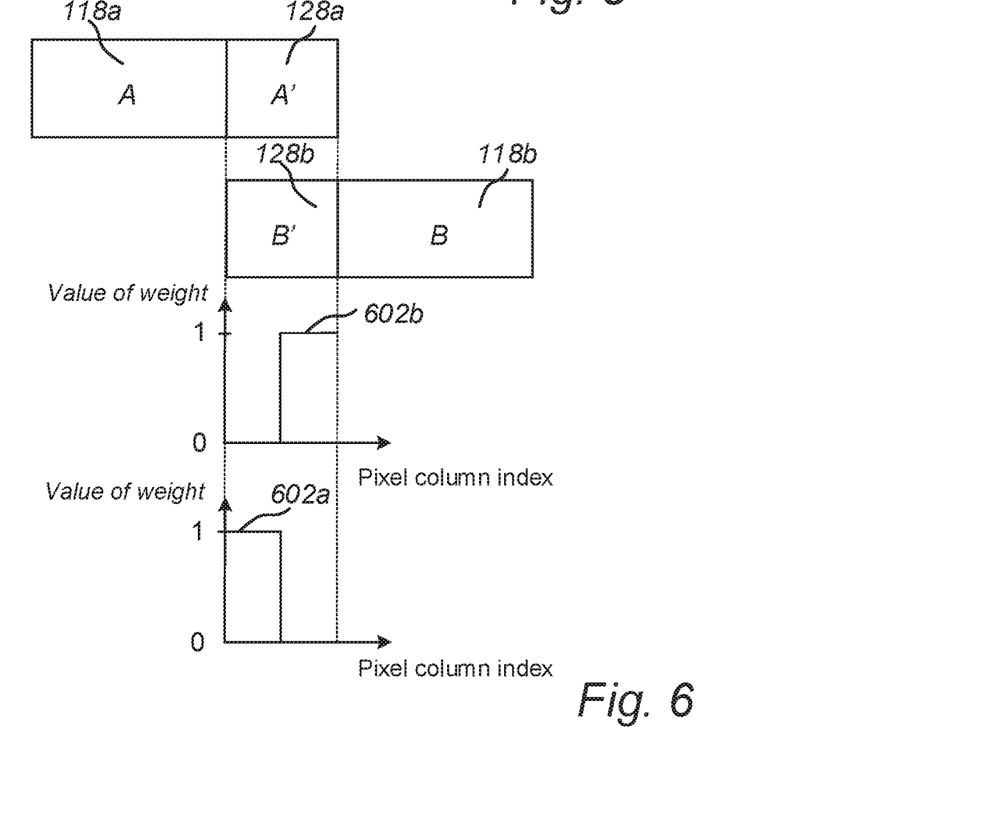
FIG. 6 schematically illustrates and example of how to select weights for blending image data of overlapping portions of a first and a second video frame.
Figure 7:
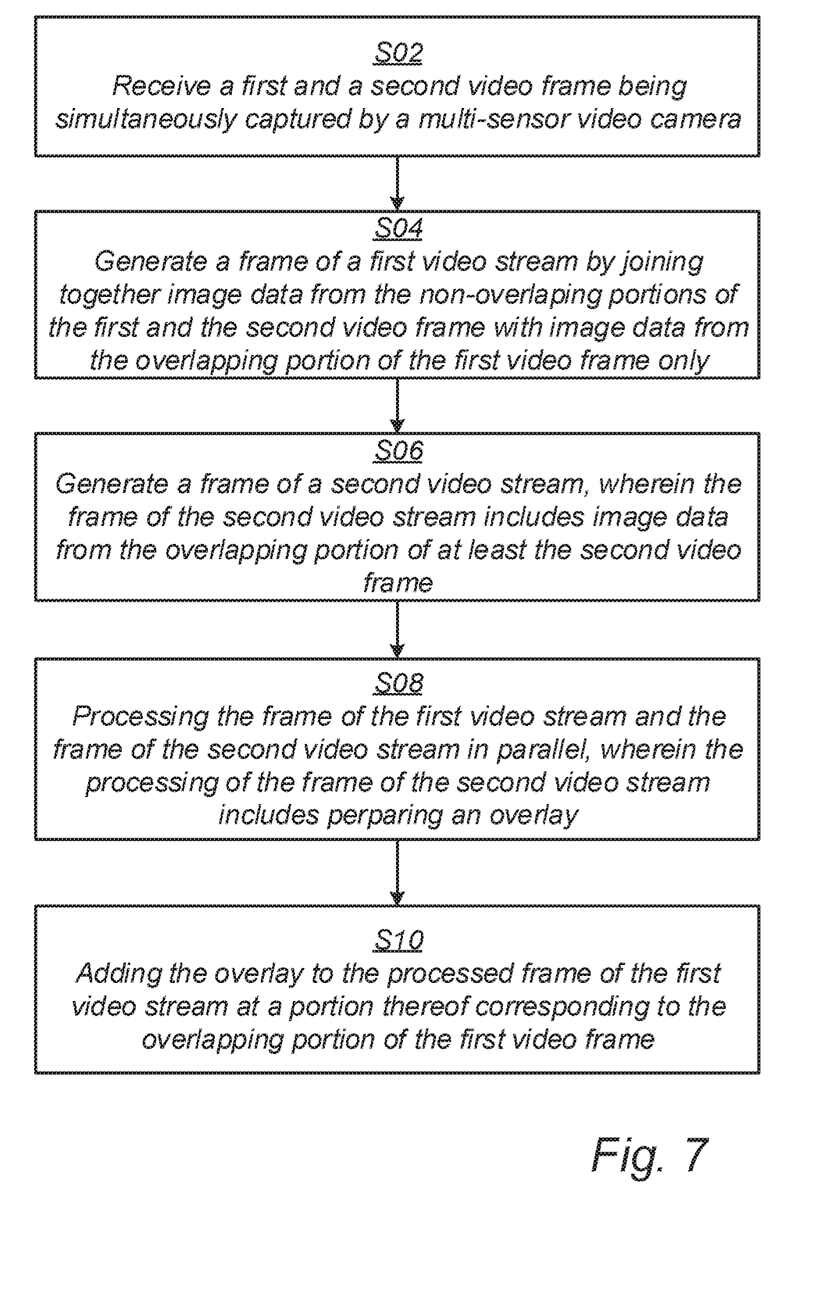
FIG. 7 is a flowchart of a method performed in a multi-sensor video camera according to embodiments.

The operation of the processing pipeline 104 will now be described in the following with reference to FIGS. 1-6 and the flow chart of FIG. 7.

In step S02, the receiver 202 receives the first video frame 108a, and the second video frame 108b from the image sensors 102a, 102b. The first video frame 108a and the second video frame 108b are simultaneously captured by the video camera 100.

Figure 3:
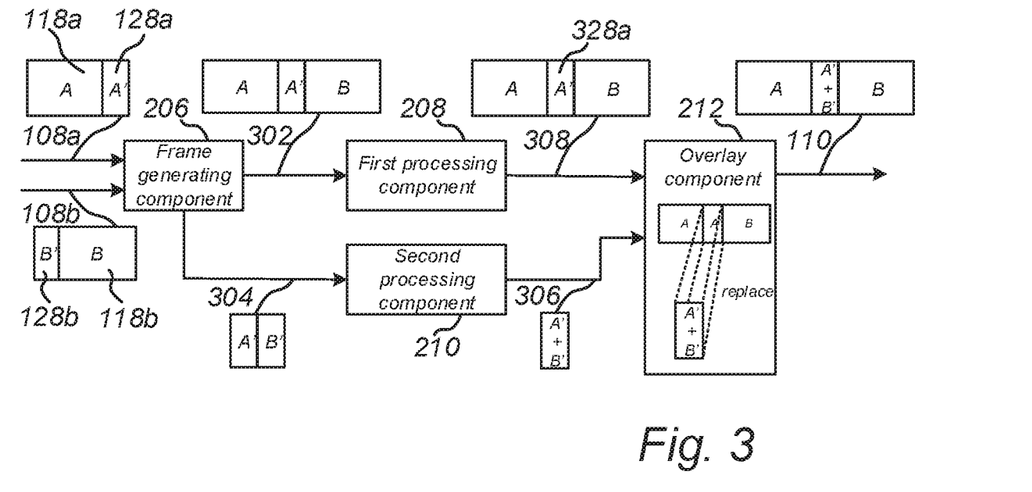
FIG. 3 schematically illustrates a processing flow in the processing pipeline according to a first group of embodiments.
Figure 4:
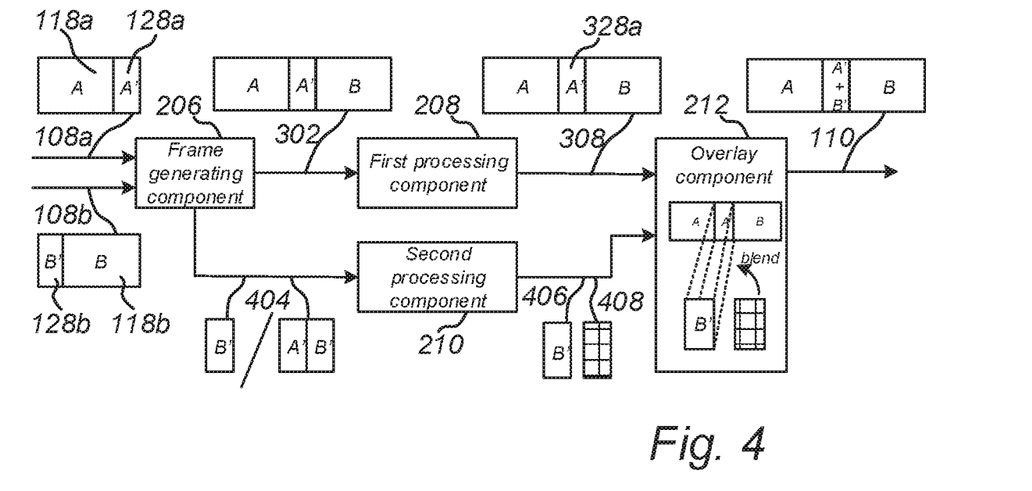
FIG. 4 schematically illustrates a processing flow in the processing pipeline according to a second group of embodiments.

FIGS. 3 and 4 illustrate the first video frame 108a and the second video frame 108b in more detail. The first video frame 108a has a portion 118a where it does not overlap with the second video frame 108b. In other words, pixels of the non-overlapping portion 118a depict a part of the scene which is not depicted by the second video frame 108b. The non-overlapping portion 118a of the first video frame 108a comprises image data A. Similarly, the second video frame 108b has a portion 118b where it does not overlap with the second video frame 108b. The non-overlapping portion 118b of the second video frame 108b comprises image data B. The first video frame 108a further has a portion 128a where it overlaps with a portion 128b of the second video frame 108b. In other words, pixels of the portions 128a, 128b depict the same part of the scene. The overlapping portion 128a of the first video frame 108a comprises image data A', and the overlapping portion 128b of the second video frame 128b comprises image data B'.

In step S04, the frame generating component 206 proceeds to generate a frame 302 of a first video stream. The frame 302 is generated by joining together image data A from the non-overlapping portion 118a of the first video frame 108a, image data A' from the overlapping portion 128a of the first video frame 108a, and image data B from the non-overlapping portion 118b of the second video frame 108b. In this way, the frame 302 includes image data A, A' from the whole first video frame 108a, and image data B from the non-overlapping portion of the second video frame 108b. Notably, image data B' from the overlapping portion 128b of the second video frame 108b is not included in the frame 302. Thus, for portions where the video frames 108a, 108b overlap, image data from only one of the video frames is included in the frame 302.

The frame 302 of the first video stream is a panorama image which covers the combined fields of view of the image sensors 102a, 102b. However, when generating this panorama image, no blending of image data from the input video frames 108a, 108b is carried out. Instead, image data from one video frame is selected for each pixel in the panorama image in the manner described above. In more detail, the frame 302 is generated by joining together image data A, A', B from the portions 118, 128a, 118b of the first and the second video frames 108a, 108b. This means that the image data A, A', B is arranged side by side in an appropriate order so that it forms a new image, a panorama image, which covers the combined fields of view of the image sensors 102a, 102b.

The frame 302 of the first video stream is then forwarded to the first processing component 208.

The frame generating component 206 further generates a frame 304, 404 of a second video stream. The frame 304, 404 comprises image data of the overlapping portion of at least the second video frame 128b.

In a first group of embodiments, illustrated in FIG. 3, the frame 304 of the second video stream comprises image data A' B' from the overlapping portions 128a, 128b of both the first video frame 108a and the second video frame 108b. In a second group of embodiments, illustrated in FIG. 4, the frame 404 of the second video stream may comprise image data B' from the second video frame 108b only, or from both the first video frame 108a and the second video frame 108b. These two alternatives are separated by a "/"-sign in FIG. 4.

The frame 304, 404 is then input to the second processing component 210.

In step S08, the first processing component 208 processes the frame 302 and the second processing component 210 processes the frame 304, 404. The processing of the frame 302 of the first video stream and the frame 304, 404 of the second video stream is made in parallel.

As further mentioned above, the processing of the frame 302 of the first video stream may include various image processing steps, such as defect pixel correction, artefact removal like column fixed pattern noise compensation and crosstalk compensation, white balancing, vignetting correction, noise filtering, demosaicing, sharpening, colour matrixing, dark current correction, and gamma correction. Some or all of the image processing may be carried out by the image processing component 204 before generating the first and the second video stream, and some or all of the image processing steps may be carried out after generating the first and the second video stream by the first processing component 208. The processing of the frame 302 of the first video stream typically also includes alignment as is known in the art. This may include barrel-distortion correction of the frame 302 or portions thereof (i.e., portions coming from the first video frame 108*a*, and the second video frame 108*b* may require different corrections), rotation of the frame 302 or portions thereof (in case the video camera is arranged to take pictures in a standing format), and projection of the frame 302, or rather the portions coming from different ones of the video frames 108*a*, 108*b*, on a surface, such as a cylinder. The latter is made to compensate for the fact that the video frames 108*a*, 108*b* are captured from different points of view. Typically, the same alignment is made for each frame following an initial calibration of the camera. Thus, the alignment may be made on basis of parameters from a calibration of the image sensors of the camera.

The processed version of the frame 302 is denoted by 308 in FIGS. 3 and 4.

The processing of the frame 304, 404 of the second video stream may also include alignment, in accordance with what has been described above, and preparation of an overlay 306, 406. Typically, the frame 302 is much larger than the frame 304, 404, such that the alignment and preparation of the overlay from frame 304, 404 may be carried out while the frame 302 is aligned and otherwise processed by the first processing component 208

In the first group of embodiments shown in FIG. 3, the preparation of the overlay 306 includes blending, i.e., mixing of image data A' and B' from the overlapping portions 128*a*, 128*b* from the first and the second video frames 108*a*, 108*b*. In such embodiments, the overlay 306 being output from the second processing component 210 includes blended image data. The second processing component 210 may, e.g., blend the image data A', B' by calculating a weighted average of image data A' and image data B' for each corresponding pixel in the overlapping portions 128*a*, 128*b*. The weights of the weighted average may be different for different pixels. Denoting the weight w, $0 \leq w \leq 1$, applied to image data B' in pixel x by w(x), the blending may be described as:

$$(1-w(x))A'(x)+w(x)B'(x)$$

Here B'(x) denotes image data in the overlapping portion 128*b* in pixel x, and A'(x) denotes image data in the overlapping portion 128*a* in the pixel corresponding to pixel x.

The weights may be selected independently of the image data A', B'. The weights may also remain constant over time. According to one embodiment falling under the first group of embodiments of FIG. 3, the weight w associated with image data B' depends on a shortest distance from a pixel in the overlapping portion 128*b* of the second video frame 108*b* to the boundary of the non-overlapping portion 118*b* of the second video frame 108*b*. This implies that the weight (1−w) associated with image data A' will depend on the shortest distance between the corresponding pixel in the overlapping portion 128*a* and the boundary between the overlapping portion 128*a* and the non-overlapping portion 118*a* of the first video frame 108*a*. This is further illustrated in FIG. 5, where it is shown that the weight 502*b* applied to the image data B' is a function of distance to the boundary between the overlapping portion 128*b* and the non-overlapping portion 118*b*. Further, the weight 502*a* applied to the image data A' is a function of distance to the boundary between the overlapping portion 128*a* and the non-overlapping portion 118*a* as illustrated in FIG. 5. Here the weight is proportional to the proximity to the boundary, i.e., it increases linearly with the proximity to the boundary. However, it is to be understood that other functional relationships are equally possible. However, the weight typically increases with the proximity to the boundary.

The weights may further be selected differently for low-frequency contents, such as spatial frequencies below a first threshold, and for high-frequency contents, such as frequencies equal to or above a second threshold. The second threshold may be equal to or larger than the first threshold. In such case, the image data A', B' may be subject to spatial high-pass filtering and spatial low-pass filtering to extract low-frequency contents and high-frequency contents of the image data A', B'. A first weighted average may be calculated for the low-frequency contents, by selecting the weights in a first manner. For example, the weights for the low-frequency contents may be selected as described with respect to FIG. 5. A second weighted average may be calculated for the high-frequency contents, by selecting the weights in a second manner. For example, the weight for the high-frequency contents may be selected as shown in FIG. 6, where the weight 602*b* applied to the image data B' and the weight 602*a* applied to the image data A' is shown. In this case, the weights are either zero or one. The weight 602*b* is equal to one for pixels in the portion 128*b* which have a distance to the boundary between portions 118*b*, 128*b* which is shorter than the distance for a corresponding pixel in portion 128*a* to the boundary between portions 118*a*, 128*a*. For other pixels in portion 128*b*, the weight is zero.

The weights may also be selected to depend on the image data A', B'. In one example, the weights may be governed by the presence of objects, such as a person, in the overlapping portions 118*a*, 118*b*. In more detail, since the image sensors 102*a*, 102*b* view the scene from slightly different positions and angles, the first and the second video frame 108*a*, 108*b* will be subject to the parallax effect. As a result, if there is an object present in the scene, the object may turn up at slightly different positions in the overlapping portions 128*a*, 128*b* even if alignment has been carried out. Thus, if image data A', B' in the overlapping portions 128*a*, 128*b* is blended by forming a weighted average, the object may turn up in duplicate in the blended image. To avoid this situation, one may select to include the object from one of the overlapping portions 128*a*, 128*b* only. In more detail, objects may be detected in the overlapping portions 128*a*, 128*b* using standard object detection techniques. For pixels being identified as belonging to an object in the overlapping portions 128*a*, 128*b*, the weight for one of image data A' from the first video frame 108*a* and image data B' from the second video frame 108*b* may be set to zero, meaning that image data from only one of the first video frame 108*a* and the second video frame 108*b* is included in the blended image.

In the second group of embodiments illustrated in FIG. 4, the preparation of the overlay 406 does not include blending of image data A', B'. In these embodiments, the overlay 406 includes image data B' from the overlapping portion 128*b* of the second video frame 108*b* only. In fact, the overlay 406 typically is a direct correspondence to the overlapping portion 128*b* of the second video frame 108*b* in that each pixel of the overlay 406 corresponds to a pixel of the overlapping portion 128*b* of the second video frame 108*b*. Instead of carrying out any the blending, the second processing component 210 according to the second group of embodiments calculates a mask 408. The mask 408 defines for each value of the overlay 408 a value, which may be referred to as a degree of blending. The degree of blending is a value between zero and one which describes how high degree, i.e., how high percentage, of the overlay 408 that should be included in a blending of the overlay 408 with another piece of image data. Since the overlay 408 corresponds to image data B' of the overlapping portion 128b of the second video frame 108b, and the other piece of image data corresponds to image data A' of the first video frame 108a (as will be described later), the degree of blending is equivalent to the weight w to be applied to image data B' from the second video frame 108b as described above with respect to the first group of embodiments. In other words, in the second groups of embodiments, the second processing component 210 calculates the weights w but does not perform the actual blending.

What has been said in the above, in connection to the first group of embodiments, about calculating the weight w to be applied to image data B' thus apply equally well to the second group of embodiments. In cases where the weight is calculated independently of image data, the frame 404 which is input to the second processing component 210 only needs to include image data B' from the overlapping portion 128b of the second video frame 108b. In cases where the weight is calculated dependent on image data, the frame 404 which is input to the second processing component 210 comprises image data A', B' from both overlapping portions 128a, 128b.

In order to further speed up the processing, it is possible to re-use a mask from the processing of a previous frame. For instance, the mask may be updated at a rate which is lower than a rate at which video frames are received from the first and the second sensors 102a, 102b. In this way, processing time is reduced, thereby further reducing latency in the system.

In step S10, the overlay component 212 proceeds to add the overlay 306, 406 to the processed frame 308 of the first video stream. In particular, the overlay component 212 adds the overlay 306, 406 at a portion 328a of the processed frame 308 corresponding to the overlapping portion 128a of the first video frame 108a. The adding of the overlay may be done by replacement, which is the case for the first group of embodiments, or by way of blending, which is the case for the second group of embodiments.

More specifically, in the first group of embodiments shown in FIG. 3, image data A', B' was already blended when preparing the overlay 306. Therefore, no further blending is necessary when adding the overlay 306 to the processed frame 308 of the first video stream. The overlay component 212 may therefore replace image data in portion 328a of the processed frame 308 as illustrated in FIG. 3. This may, e.g., be achieved by setting a transparency parameter of the overlay to be equal to zero, thereby instructing the overlay component 212 to add the overlay 306 in a non-transparent way, which, in practice, is the same thing as adding the overlay 306 by way of replacing image data.

In the second group of embodiments shown in FIG. 4, the overlay component 212 proceeds to blend image data A', B' upon adding the overlay 406 to the processed frame 308. The overlay component 212 carries out the blending in accordance with the mask 408 that was calculated by the second processing component 210. In more detail, the overlay component 212 may calculate a weighted average of the overlay 406 and the portion 328a of the processed frame 308. The weights of the pixels of the overlay 406 are given by the mask 408, and the weights to be applied to the portion 328a are given by one minus the value of the mask at the corresponding pixel position. In practice, this may be achieved by using the mask to set the transparency level of the overlay on a pixel-wise basis.

As a result of adding the overlay 306, 406 to the processed frame 308, a panorama image 110 is generated. The panorama image 110 is a stitching of the first video frame 108a and the second video frame 108b. The panorama image 110 comprises image data A from the first video frame 108a for the part of the scene which is depicted in the first video frame 108a but not the second video frame 108b. Similarly, the panorama image 110 comprises image data B from the part of the scene which is depicted in the second video frame 108b but not in the first video frame 108a. For the part of the scene which is depicted by both the first video frame 108a and the second video frame 108b, the panorama image 110 comprises a blending of image data A' from the first video frame 108a and image data B' from the second video frame 108b as described above.

It will be appreciated that a person skilled in the art can modify the above-described embodiments in many ways and still use the advantages of the invention as shown in the embodiments above. For example, for the sake of simplicity, the above examples are given for a video camera with two sensors. However, the invention applies equally well if there are more than two sensors. Thus, the invention should not be limited to the shown embodiments but should only be defined by the appended claims. Additionally, as the skilled person understands, the shown embodiments may be combined.

The invention claimed is:

1. A method performed in a multi-sensor video camera having a first and a second sensor with partly overlapping fields of view, comprising:
   receiving a first video frame and a second video frame being simultaneously captured by the first sensor and the second sensor, respectively,
   wherein each of the first and the second video frame has a non-overlapping portion where it does not overlap with the other of the first and the second video frame, and an overlapping portion where it overlaps with the other of the first and the second video frame,
   generating a frame of a first video stream by joining together image data from the non-overlapping portions of the first and the second video frame with image data from the overlapping portion of the first video frame only,
   generating a frame of a second video stream, wherein the frame of the second video stream includes image data from the overlapping portion of at least the second video frame,
   processing the frame of the first video stream and the frame of the second video stream in parallel, wherein the processing of the frame of the second video stream includes preparing an overlay based on the image data from the overlapping portion of at least the second video frame, and
   adding the overlay to the processed frame of the first video stream at a portion thereof corresponding to the overlapping portion of the first video frame,
   wherein image data from the overlapping portion of the first video frame is blended with image data from the overlapping portion of the second video frame in at least one of the steps of preparing the overlay and adding the overlay.

2. The method of claim 1, wherein the frame of the second video stream comprises image data from the overlapping portions of the second and the first video frame, and wherein the step of preparing the overlay includes blending image data from the overlapping portion of the second video frame with image data from the overlapping portion of the first video frame.

3. The method of claim 2, wherein, in the step of adding the overlay, the overlay replaces image data of the processed frame of the first video stream in the portion corresponding to the overlapping portion of the first video frame.

4. The method of claim 2, wherein the blending includes calculating a weighted average of image data from the first video frame and image data from the second video frame for each pixel in the overlapping portions,
wherein a weight associated with the image data from the overlapping portion of the second video frame depends on a shortest distance from the pixel to the boundary between the overlapping portion and the non-overlapping portion of the second video frame, and
wherein a weight associated with the image data from the overlapping portion of the first video frame depends on a shortest distance from the pixel to the boundary between the overlapping portion and the non-overlapping portion of the first video frame.

5. The method of claim 2, wherein the blending includes:
calculating a first weighted average of image data from the overlapping portion of the first video frame and image data from the overlapping portion of the second video frame, wherein the first weighted average is calculated with respect to spatial frequencies being lower than a first threshold,
calculating a second weighted average of image data from the overlapping portion of the first video frame and image data from the overlapping portion of the second video frame, wherein the second weighted average is calculated with respect to spatial frequencies being equal to or above a second threshold, the second threshold being larger than or equal to the first threshold,
wherein weights are selected differently for the first weighted average and the second weighted average, and
calculating the overlay by adding the first weighted average to the second weighted average.

6. The method of claim 2, wherein the blending includes:
identifying objects in the overlapping portion of the first video frame and in the overlapping portion of the second video frame,
calculating a weighted average of image data from the first video frame and image data from the second video frame in the overlapping portions,
wherein, if an object is identified in both the overlapping portion of the first video frame and in the overlapping portion of the second video frame, a weight associated with one of image data of the first video frame or image data of the second video frame is set to zero for pixels identified as belonging to that object.

7. The method of claim 1, wherein the overlay includes image data from the overlapping portion of the second video frame only, and wherein the step of adding the overlay includes blending the overlay with the processed frame of the first video stream at the portion thereof corresponding to the overlapping portion of the first video frame.

8. The method of claim 7, wherein the blending of the overlay with the processed frame of the first video stream is made in accordance with a mask which for each pixel of the overlay defines a degree of blending.

9. The method of claim 8, wherein each pixel of the overlay corresponds to a pixel of the overlapping portion of the second video frame, and wherein the degree of blending depends on the shortest distance from the pixel to a boundary between the overlapping portion and the non-overlapping portion of the second video frame.

10. The method of claim 8, wherein the frame of the second video stream includes image data from the overlapping portions of the second and the first video frame, and wherein the step of preparing an overlay further comprises calculating the mask based on the image data from the overlapping portions of the second and the first video frame.

11. The method of claim 10, wherein the mask is updated at a rate which is lower than a rate at which video frames are received from the first and the second sensor.

12. The method of claim 1, wherein the processing of the frame of the first video stream and the processing of the frame of the second video stream includes aligning image data of the first video frame and image data of the second video frame.

13. The multi-sensor video camera of claim 2, wherein the second processing component or the overlay component, when blending, is configured to:
identify objects in the overlapping portion of the first video frame and in the overlapping portion of the second video frame,
calculate a weighted average of image data from the first video frame and image data from the second video frame in the overlapping portions,
wherein, if an object is identified in both the overlapping portion of the first video frame and in the overlapping portion of the second video frame, a weight associated with one of image data of the first video frame or image data of the second video frame is set to zero for pixels identified as belonging to that object.

14. A processing pipeline for a multi-sensor video camera having a first and a second sensor with partly overlapping fields of view, comprising:
a receiver configured to receive a first video frame and a second video frame being simultaneously captured by the first sensor and the second sensor, respectively,
wherein each of the first and the second video frame has a non-overlapping portion where it does not overlap with the other of the first and the second video frame, and an overlapping portion where it overlaps with the other of the first and the second video frame;
a frame generating component configured to generate a frame of a first video stream by joining together image data from the non-overlapping portions of the first and the second video frame with image data from the overlapping portion of the first video frame only, and to generate a frame of a second video stream, wherein the frame of the second video stream includes image data from the overlapping portion of at least the second video frame,
a first processing component configured to process the frame of the first video stream,
a second processing component configured to process the frame of the second video stream in parallel with the first processing component processing the frame of the first video stream, wherein the processing of the frame of the second video stream includes preparing an overlay based on the image data from the overlapping portion of at least the second video frame; and
an overlay component configured to add the overlay to the processed frame of the first video stream at a portion thereof corresponding to the overlapping portion of the first video frame,
wherein at least one of the second processing component and the overlay component is configured to blend image data from the overlapping portion of the first video frame with image data from the overlapping portion of the second video frame when preparing the overlay or adding the overlay.

15. A multi-sensor video camera, comprising:
a first sensor arranged to capture video frames depicting a first field of view;
a second sensor arranged to capture video frames simultaneously with the first sensor, the second sensor depicting a second field of view which partially overlaps with the first field of view; and
a processing pipeline comprising:
a receiver configured to receive a first video frame and a second video frame being simultaneously captured by the first sensor and the second sensor, respectively,
wherein each of the first and the second video frame has a non-overlapping portion that does not overlap with the other of the first and the second video frame, and an overlapping portion that overlaps with the other of the first and the second video frame;
a frame generating component configured to generate a frame of a first video stream by joining together image data from the non-overlapping portions of the first and the second video frame with image data from the overlapping portion of the first video frame only, and to generate a frame of a second video stream, wherein the frame of the second video stream includes image data from the overlapping portion of at least the second video frame,
a first processing component configured to process the frame of the first video stream,
a second processing component configured to process the frame of the second video stream in parallel with the first processing component processing the frame of the first video stream, wherein the processing of the frame of the second video stream includes preparing an overlay based on the image data from the overlapping portion of at least the second video frame; and
an overlay component configured to add the overlay to the processed frame of the first video stream at a portion thereof corresponding to the overlapping portion of the first video frame,
wherein at least one of the second processing component and the overlay component is configured to blend image data from the overlapping portion of the first video frame with image data from the overlapping portion of the second video frame when preparing the overlay or adding the overlay.

16. The multi-sensor video camera of claim 15, wherein the frame of the second video stream comprises image data from the overlapping portions of the second and the first video frame, and wherein the second processing component or the overlay component, when preparing the overlay or adding the overlay, is configured to blend image data from the overlapping portion of the second video frame with image data from the overlapping portion of the first video frame.

17. The multi-sensor video camera of claim 16, wherein when adding the overlay, the second processing component or the overlay component is configured to replace, with the overlay, image data of the processed frame of the first video stream in the portion corresponding to the overlapping portion of the first video frame.

18. The multi-sensor video camera of claim 16, wherein the second processing component or the overlay component, when blending, is configured to calculate a weighted average of image data from the first video frame and image data from the second video frame for each pixel in the overlapping portions,
wherein a weight associated with the image data from the overlapping portion of the second video frame depends on a shortest distance from the pixel to the boundary between the overlapping portion and the non-overlapping portion of the second video frame, and
wherein a weight associated with the image data from the overlapping portion of the first video frame depends on a shortest distance from the pixel to the boundary between the overlapping portion and the non-overlapping portion of the first video frame.

19. The multi-sensor video camera of claim 16, wherein the second processing component or the overlay component, when blending, is configured to:
calculate a first weighted average of image data from the overlapping portion of the first video frame and image data from the overlapping portion of the second video frame, wherein the first weighted average is calculated with respect to spatial frequencies being lower than a first threshold,
calculate a second weighted average of image data from the overlapping portion of the first video frame and image data from the overlapping portion of the second video frame, wherein the second weighted average is calculated with respect to spatial frequencies being equal to or above a second threshold, the second threshold being larger than or equal to the first threshold,
wherein weights are selected differently for the first weighted average and the second weighted average, and
calculate the overlay by adding the first weighted average to the second weighted average.

20. A computer program product comprising a computer-readable medium having computer-code instructions stored thereon for carrying out a method that, when executed by a device having processing capability, cause the device to:
receive a first video frame and a second video frame being simultaneously captured by the first sensor and the second sensor, respectively,
wherein each of the first and the second video frame has a non-overlapping portion that does not overlap with the other of the first and the second video frame, and an overlapping portion that overlaps with the other of the first and the second video frame,
generate a frame of a first video stream by joining together image data from the non-overlapping portions of the first and the second video frame with image data from the overlapping portion of the first video frame only,
generate a frame of a second video stream, wherein the frame of the second video stream includes image data from the overlapping portion of at least the second video frame,
process the frame of the first video stream and the frame of the second video stream in parallel, wherein the processing of the frame of the second video stream includes preparing an overlay based on the image data from the overlapping portion of at least the second video frame, and
add the overlay to the processed frame of the first video stream at a portion thereof corresponding to the overlapping portion of the first video frame,
wherein image data from the overlapping portion of the first video frame is blended with image data from the overlapping portion of the second video frame when preparing the overlay or adding the overlay.

* * * * *